United States Patent [19]
Omori et al.

[11] 3,980,513
[45] Sept. 14, 1976

[54] PROCESS FOR MAKING LAMINATES OF SHEET-FORMED, RETICULATED FIBROUS STRUCTURES

[75] Inventors: Akira Omori; Isao Okamura; Tadasi Imoto, all of Sagamihara; Tadayuki Katoh, Tokyo, all of Japan

[73] Assignee: Teijin Limited, Osaka, Japan

[22] Filed: July 3, 1974

[21] Appl. No.: 485,635

Related U.S. Application Data

[60] Continuation-in-part of Ser. No. 263,443, June 16, 1972, abandoned, which is a division of Ser. No. 136,511, April 22, 1971, abandoned.

[52] U.S. Cl. .............................. 156/244; 156/306; 264/51; 264/210 R; 264/288; 264/292; 264/321
[51] Int. Cl.² .......................................... B29D 27/00
[58] Field of Search ............ 156/163, 282, 306, 308, 156/244; 264/51, 53, 54, 321, DIG. 8

[56] References Cited
UNITED STATES PATENTS

| | | |
|---|---|---|
| 3,539,666 | 11/1970 | Schirmer .............................. 264/51 |
| 3,549,470 | 12/1970 | Greenwald et al. ............. 264/DIG. 8 |
| 3,562,369 | 2/1971 | Chopra et al. .................. 264/DIG. 8 |

FOREIGN PATENTS OR APPLICATIONS

1,171,971   11/1969   United Kingdom

*Primary Examiner*—Caleb Weston
*Attorney, Agent, or Firm*—Sherman & Shalloway

[57] ABSTRACT

A composite structure is prepared by extruding a molten thermoplastic resin and foaming agent through a die and simultaneously quenching and taking-up the extrudate under such conditions that the extrudate is fibrillated just as it leaves the die exit without passing through the foamed state. The unopened, sheet-formed and reticulated fibrous structures thus obtained are laminated, pulled apart and pressed. The composite product consists of a fine and uniform fibrillar structure having superior mechanical strength and pliability and are useful for a wide range of applications such as paper substitute, artificial wood veneer and the like. Colored products are also described.

15 Claims, 21 Drawing Figures

PROCESS FOR MAKING LAMINATES OF SHEET-FORMED, RETICULATED FIBROUS STRUCTURES

This application is a continuation-in-part of our co-pending application, Ser. No. 263,443 filed June 16, 1972, now abandoned, which is a divisional application of Ser. No. 136,511 filed Apr. 22, 1971, now abandoned.

This invention relates to a process for making a laminate of sheet-formed, reticulated fibrous structures.

A process for making fibrillated filamentary structures through such procedures as extruding a blend of filament-forming, thermoplastic molten polymer containing foaming material into a film sheet, and fibrillating the extrudate by drawing, while maintaining the extrudate at temperatures above the glass transition point of the polymer, is known from, for example, British Patent No. 1,165,934.

Such prior art discloses a process which comprises extruding a blend of molten polymer with a foaming agent through a die by means of an extruder into a film, blowing a gas or liquid (preferably air) onto the top and bottom of the film through a fork to cause fibrillation thereof while maintaining the film at temperatures above the glass transition temperature of the polymer employed, false-twisting the fibrillated product with a false-twisting machine, and drawing the same with a drawing machine to provide fibrillated filaments (cf. the specified patent specification, page 1, line 72 — page 2, line 10, and FIG. 1).

However, in the process following such prior art, the foams formed in the extrudate immediately after its departure from the die exit gradually grow because the extrudate is maintained at temperatures above the glass transition point of the polymer, and are elongated by the drafting and ruptured. Consequently, the resulting reticulated structures invariably have large meshes and nodes. Thus, the process can provide no other than sheet-formed, reticulated fibrous structures lacking pliability or softness.

Furthermore, the above mentioned British Patent No. 1,165,934 discloses a process comprising extruding a blend of polymer with a foaming agent through a die with an extruder, cooling the extrudate to temperatures below the glass transition point of the polymer in a cooling tank, withdrawing the resulting film onto a godet thereby drawing the same, and thereafter fibrillating the same by such mechanical means as false twisting, splitting with a knife edge, etc. (cf. the same patent specification, page 2, lines 86 – 96, and FIG. 2).

According to that process, again the foams formed in the extrudate gradually grow and increase in size because the die and cooling tank are spaced apart by an appreciable distance. When the foamed film which has been cooled to below the glass transition temperature of the polymer is drawn, reticulated structures can hardly be obtained, although the so-called split fibers may be prepared. Furthermore, the process fails to provide pliable products composed of fine denier fibers.

Also the U.S. Pat. No. 3,539,666 by H. G. Schirmer et al. discloses a process for producing non-woven fabrics which comprises first forming a plastic sheet with a cellular structure, adjusting the temperature of the plastic sheet to its hardening-orientation temperature, drawing the temperature-conditioned sheet by means of a mandrel and, following the drawing, extending the sheet until the cellular structure ruptures. The process of Schirmer et al. consists of forming a foamed sheet followed by orientation, and then fibrillating the sheet after being mechanically extended. With such a method in which the foamed sheet is mechanically fibrillated, the fibers constituting the fibrillated structure are not fine and the reticulate structure is coarse, resulting in fibrous structure lacking pliability.

U.S. Pat. No. 3,549,470 by E. F. Greenwald et al. and U.S. Pat. No. 3,562,369 by S. N. Chopra et al. teach methods of fibrillating the foamed thermoplastic resin sheet by a hot-melt attenuation technique at a temperature above the glass transition temperature of the polymeric material. But the fibrillated structures made by the hot-melt attenuation technique is rough in reticular structure as well as in nodes, and lack fineness or pliability.

Example B of the above Greenwald et al. teaches to cool the hotmelt, foamed extrudate in a water-quenching bath placed 10 inches apart from the die head to a temperature below the glass transition temperature, orienting it, and fibrillating the extrudate through a tortuous path. In this case, however, the foamed sheet is once formed and fibrillated mechanically, accompanied by the afore-mentioned drawbacks.

Thus the sheet-formed fibrous structures obtained through the conventional processes described above possess the serious deficiency in common, that their utility is severely limited.

Furthermore, British Patent No. 1,171,971 discloses a process for producing a non-woven fibrillar structure comprising a plurality of layers of oriented fibrillatable polymeric film and needle-punching the structure so formed in a needle-loom such that the layers are fibrillated. However, according to the process disclosed in the British Patent, it is difficult to obtain a product in which the individual fibers constituting the fibrillar structure are sufficiently fine and uniform, and it is not suitable for application as a paper substitute, for example.

The object of the present invention is to provide a process for making a composite structure from a sheet-formed and reticulated fibrous structure free of the above deficiencies.

The other objects and advantages of the invention will become apparent upon reading the following descriptions.

According to the invention, there is provided a process for the preparation of composite structure, which comprises:

a. extruding a molten thermoplastic resin containing a foaming substance through a die with a slit clearance of 0.1 – 1.0 mm;

b. quenching the extrudate at a point less than 5 mm away from the die surface to a temperature below the glass transition temperature of the resin;

c. simultaneously drafting the extrudate at a draft ratio between the maximum draft ratio possible under the conditions and one-third thereof, thereby fibrillating the extrudate just as it leaves the die exit;

d. laminating at least two sheets of thus obtained unopened, sheet-formed and reticulated fibrous structures so that the directions of the fibers of these structures are identical to each other;

e. pulling the laminate in the direction perpendicular to the direction of the fibers to open the same; and f. pressing the opened, sheet-formed laminate so obtained at a temperature lower than the lowest softening point of any constituent of said sheet-formed laminate.

The features of the process of this invention that can be essentially distinguished over the aforesaid prior method of fibrillating the thermoplastic resin films are to quench the molten resinous composition extruded from the die at a zone less than 5 mm away from the die surface, i.e., to quench the extrudate almost simultaneously as it leaves the die exit, and to draft the extrudate at a particular draft ratio simultaneously with the extrusion.

Thus according to the process of this invention, the two-staged step as in the fibrillating method, i.e., to extrude the foamed sheet and fibrillate the foamed sheet with a mechanical means can be dispensed with; the sheet-formed and reticulated fibrous structures are formed by extruding and at the same time fibrillating the molten resinous composition. In addition, according to the process of this invention, the resulting fibrous structures are composed of very fine fibers running in one direction, said fibers being cross-linked in the longitudinal direction to form mesh, the nodes of fibers being very fine, so that the entire fibrous structures are rich in pliability. Such sheet-formed, reticulated fibrous structures formed in accordance with the present process can be used as non-woven sheets, synthetic paper, filtering material, insulating material, cushion material, wrapping material, etc., without further processing, or may be cut and processed through paper machine in wet system, to be formed into paper. Further, such fibrous structures may be made into compound structures by the method mentioned later.

In this specification, the term "glass transition temperature" (hereinafter abbreviated as "Tg") means the temperature at which the thermoplastic resin changes from a flexible rubbery state to brittle glassy stage, or vice versa, and at which discontinuity will occur in the specific volume (cubical thermal expansion coefficient)-temperature curve as measured by the method specified by ASTM Designation: D 864-52. Tg of the thermoplastic resin varies depending on its molecular weight, content of plasticizer added, degree of cross linking and crystallinity, and in the case of a copolymer or a blend of resins, Tg varies with the degree of copolymerization or ratio of blend. Tg often is not a definite temperature but has a certain temperature range.

The term "maximum draft ratio" represents a maximum range within which the thermoplastic resin articles when being drafted under determined conditions, do not undergo breakage.

Any thermoplastic resins or polymers may be used in the process of this invention provided they are melt-extrudable in a sheet form from the die. The process of this invention is better applicable to the linear polymers as well as to the branched polymers. And in the field of fiber forming, the process of this invention can be successfully applied to the resins such as polystyrenes, which usually have been regarded as providing poor film-forming property, as well as to amorphous, semicrystalline or crystalline polymers. The aforesaid applicability to many different types of polymers makes one of the most important advantages of this invention.

In the process of this invention, it is essential as mentioned above that the molten thermoplastic resin extruded from the die exit is quenched to a temperature below Tg of the resin at a point less than 5 mm away from the die surface. However, when the resin or polymer has Tg lower than, for example, 0°C., it will be necessary to quench the extruded polymer to a temperature below such a low Tg. But, usually, to quench the polymer to such a temperature is practically very hard unless a particular manufacturing method or quenching agent is used.

Accordingly, the thermoplastic resins or polymers to be used in the process of this invention should have the glass transition temperature (Tg) of above 0°C., usually above 10°C., preferably above 20°C., and more preferably above 40°C. The resins or polymers are preferred as their Tg increases, and even those having Tg of higher than about 150°C. can be used in the process of this invention.

Examples of typical and preferred resins or polymers and their Tg that can be used in the process of this invention are listed below. But it should be noted that the following examples are only illustrative, and the resins used in the process of this invention shall not be limited to such examples.

| POLYMER | Tg (°C.) | Melting temperature (°C.) |
|---|---|---|
| Styrene resin | | |
| polystyrene | 80–100 | 230–240 |
| Polyamide resin | | |
| 6,6-nylon (polyhexamethylene adipamide) | about 49 | 250–265 |
| 6-nylon (poly-ε-carpamide) | 45–45 | 223 |
| 6,10-nylon (polyhexamethylene sebacamide) | about 30 | 209–213 |
| 4,6-nylon (polytetramethylene adipamide) | about 43 | 278–295 |
| Polyester resin | | |
| polyethylene terephthalate | about 81 (crystalline) | 264 |
|  | about 67 (amorphous) | 264 |
| polyethylene-2,6-naphthalate | about 113 | 273 |
| Vinyl resin | | |
| polyvinyl chloride | 70–80 | 174 |
| Polycarbonate resin | | |
| poly bis-phenol A carbonate | 145–150 | 265 |
| Acrylic resin | | |
| polymethyl methacrylate | 60–105 | less than 200 (isotactic) |
| Copolymer | | |
| styrene-acrylonitrile copolymer (mol percentage of styrene = 0.75) | 97 | — |

Also the blends of two or more of the afore-listed polymers blended at any ratios may be used.

Further, in the present invention a polymer having a relatively low Tg, particularly polyolefin having Tg of about 0°C. or less, for examples, a high or low density polyethylene (Tg = −21°C to −28°C.), polypropylene (Tg comes under the range of 8° to minus 35°C. depending on the kind of isomer, etc.), preferably isotactic polypropyrene, polybutene-1 (Tg = −15°C. to −45°C.) and the like may be used by blending with said resins, e.g. polystyrene. Such blends may contain a polyolefin in amounts of at most 40% and preferably 30% or less by weight based on the blend. Generally, polymer blends will have two Tg's or more, but the highest of these Tg's is important in carrying out the present invention mentioned hereinbelow. The lower Tg's can be put out of consideration. For instance, the following blends may be employed in the present invention:

| blend | Tg (°C.) |
| --- | --- |
| polystyrene/polyethylene (weight ratio of 98:2) | 76 and 0 or less |
| polyethylene terephthalate/polypropyrene (weight ratio of 70:30) | 62 and 6 |

Although not necessarily, the above resins and resinous blends may contain commonly used resin additives such as plasticizer, filler, pigment, flame-resisting agent and the like, in such amount that the Tg of the resins and resinous blends is not greatly affected.

The resins which exhibit particularly good results used in the process of this invention are polystyrene, polyethylene terephthalate, polyethylene-2,6-naphthalate, 6,6-nylon, 6-nylon, polybis-phenol A carbonate, polyvinyl chloride, polymethylmethacrylate and styrene-acrylonitrile copolymer.

Any foaming substances may be mixed into the said resins, provided they are capable of evolving foam in the resin when extruded from the die.

As the foaming substances useful for the invention, the following may be named.

1. Gases which are substantially inert to the molten polymers, such as nitrogen, carbon dioxide, helium, etc.
2. Organic liquids which are gasified at the time of melting or extruding the polymer to remarkably increase the volume of the latter, and which are substantially inert to the polymers, such as butane, propane, etc.
3. Solid foaming agents which autogeneously produce inert gases which are substantially inert to the polymer, during the melting or extruding of the polymer, such as azodicarbonamide, paratoluenesulfonyl semi-carbazide, etc.

Those foaming substances may be in the form of compressed foams in the molten polymer or dissolved or dispersed and suspended in the molten polymer in the die, because the inside of the die is maintained at appreciably higher pressures than atmospheric, due to the extrusion pressure. The quantity of the foaming substance to be added to the molten polymer may be suitably selected, depending on the type and properties of the specific foaming substance, type and properties of the polymer, and extruding conditions, etc. The amount of the foaming substance to be added will be determined easily by people skilled in the art by performing routine experiments. For instance, when an inert gas is used as the foaming substance, it may be introduced into the melt at a ratio of 10–500cc/g (based on the polymer), at a pressure of 10 Kg – 50 Kg/cm². If a volatile organic liquid is used as the foaming substance, it is generally added at a ratio of 5.0 – 30.0% by weight based on the weight of the polymer. When a solid foaming agent as named above is used, it is preferably added at a ratio of 0.5 – 5.0% by weight based on the weight of the polymer.

The resin and the foaming substance are supplied to the extruder and melted at a temperature above the melting temperature but below the decomposition temperature of the resin by the same means as in the case of making ordinary foamed sheets. For example, the resin pellet or powder together with other additives, as required, is fed to the hopper on the screw extruder, and melted and kneaded in the extruder. The foaming substance may be introduced, when it is a gas, through the gas inlet provided on the extruder, or being sprinkled over the pellets or powder when it is liquid, or through the hopper together with the resin when it is a solid.

The molten thermoplastic resin containing a foaming substance is then extruded through the die. In this case it is important to use a die having a slit clearance of 0.1 – 1.0 mm. The form of the die may be either T-die or circular die. Particularly, it is preferable that the die has a slit space of 0.15 – 0.55mm. When the slit space of the die is narrower than 0.1 mm, the sheet-formed fibrous structures extruded therethrough are apt to break, and manufacture of the sheet material at high draft ratio and high productivity is rendered impossible. Conversely, when the slit width exceeds 1.0 mm, the quenching of the extrudate is rendered insufficient, and fine and uniform foaming is hindered. Furthermore, the cracking due to rupture of the foams becomes non-uniform and insufficient, and the intended product cannot be obtained.

A widely used die may be employed in the process of this invention. The pressure at the time of extruding the molten resin composition from the die may be determined depending on the clearance of die lips and kinds of resins used, but usually ranges roughly from 50 to 150 kg/cm². The extruded speed, though dependent upon the amount of the molten resin composition blown and clearance of the die lips, practically ranges from 30 – 200cm/min., and preferably 50 – 150 cm/min.

The extrudate is then quenched to a temperature below Tg of the resin. What is important at that moment is to quench the extrudate at a point less than 5 mm away from the die surface, i.e., to quench the extrudate as soon as it leaves the die exit.

Certain types of copolymers or resinous blends which may be used in the present invention may have two Tg's or more depending on the monomer combination of the copolymer, kind and ratio of polymer in their blend and the like. In the case of the resin having two Tg's or more, by Tg in the expression of "quenched to a temperature below Tg of the resin" is meant the highest of two Tg's or more. Accordingly, Tg's with a 70/30 blend of the above polyethylene terephthalate/polypropylene is 62°C. and 6°C. It will suffice to quench to a temperature below 62°C., but it is not required to quench the extrudate to a temperature below 6°C.

There is no problem if the quenching temperature is lower than the Tg of the resin. But with the quenching temperature near Tg, the fibrillation of the extrudate will become non-uniform getting coarse. Therefore, after having left the die exit, the extrudate is preferably quenched to a temperature lower than the Tg of the molten resin by at least 5°C. Upon quenching the extrudate to the temperature, fine and uniform foams are formed in the extrudate, and the degree of split-off of the extrudate is markedly promoted. Uniform and fine reticulated structure can thus be prepared. If the extrudate is drafted at or above the Tg of the polymer, the split-off of the extrudate takes place non-uniformly and coarsely as mentioned already, and the resulting sheet-formed products acquire large nodes and lack pliability. The quenching may be effected by any conventional means so far as the extrudate is quenched to a temperature below the Tg of the polymer at a zone less than 5 mm away from the die surface. For example, a suitable cooling medium may be blown against the extrudate, jetted through a nozzle mounted closely to the die exit, or the die lips may be cooled by some external means. In the former example, the jetting nozzle of the cooling medium should be positioned either in contact with the die exit or spaced from the exit; in the latter case the distance therebetween should be less than 5 mm. Useful cooling medium may be gases or liquids which are inert to the molten polymer. Examples of such gases may be air, nitrogen gas, carbon dioxide, but air is preferred. Preferable example of liquid is water. The temperature of the cooling medium should be low enough to quench the molten resin extruded through the die to a temperature below the Tg of the resin immediately after it has left the die exit. Hence the temperature of the cooling medium used varies over the wide range depending on the Tg of the resins used. For example, when using resins having relatively high Tg, usually above 40°C., such as styrene resins, polyester resins and polycarbonates, as preferably used in this invention, the air of room temperature or cooled a little may simply be blown thereto to attain the object of quenching sufficiently.

On the other hand, where the resin having relatively low Tg such as of 0° – 20°C. is being used, a cooling medium should be used to quench the resin to a temperature several degrees and preferably 5° – 10°C. lower than the Tg of the resin, so that effective quenching is performed.

Another important feature of the process of this invention that should be essentially distinguished over the prior fibrillating method is to draft the extrudate simultaneously with the extrusion at a draft ratio between the maximum draft ratio possible under the conditions and one-third thereof, in order to fibrillate (split) the extrudate simultaneously with the extrusion, without passing through the state of foamed sheet.

In this invention, in order to draft the extrudate at a specific draft ratio without forming a foamed sheet, there may be provided at least a pair of take-up rollers maintaining some distance from the die exit, and taking up the extrudate at a taking-up speed represented by the following relation but keeping the draft ratio to be within the afore-mentioned range.

$$\text{draft ratio} = \frac{\text{take-up speed of extrudate by take-up rollers}}{\text{extrusion speed of molten resin at die exit}}$$

The extrusion speed is determined by the amount of molten resin blowing and the clearance of the die lips, and the take-up speed is determined by the surface speed of the take-up rollers. If the draft ratio exceeds its maximum value, the sheet-like material extruded through the die will be broken, and if it is less than one-third of the maximum draft ratio, the thickness of the extruded sheet will not be reduced satisfactorily, resulting in insufficient fibrillation of the extrudate. Consequently, the deniers of the fibers composing the resulting sheet-formed reticulated fibrous structures become non-uniform and too large. The specific draft ratios of extrudates vary widely depending on the types of polymers, temperature of the extrudate to be drafted and so on. Usually, it is preferred that the draft is effected at its maximum draft ratio or at a ratio near to it, and advantageously over the range of maximum draft ratio to three-fourths of the maximum.

For example, in the case of polystyrene, the maximum draft ratio at 55°C. is about 150; hence when using a polystyrene, it is preferred that the draft ratio be effected within the range of 150 – 120.

In this way, according to the process of this invention, the sheet-formed fiber structures which are fibrillated at the time of extruding the molten resin composition, are obtained.

The sheet-formed fibrous structures thus obtained in accordance with the process of the present invention under the above described conditions possess numerous non-continuous cracks or splits along the direction of drafting, extremely fine and numerous fibers forming a reticulated structure and directed one direction as very finely spaced from each other. That is, the structures are not opened into fibers. As already mentioned, the structures are valuable for various utilities as they are. Also, at least two of the unopened, sheet-formed and reticulated fibrous structures may be superposed with the directions of their fibers conformed, pulled in the direction perpendicular to the direction of fibers and extended. Thus the sheets are opened and made into a physically uniform, reticulated structures, the contact area and entanglement between the sheets being remarkably increased. The structures are further pressed to fix the entanglement between the sheets, and to provide non-woven fabric having high strength not only in the direction of cracks in the constituent sheets but also in the direction perpendicular thereto. The opening of sheet-formed fibrous structures can be effected using the apparatus conventionally used for extension of synthetic resin film, such as a pin or clip tentering machine. The opening ratio is variable depending on the intended utility of the product, but normally an opening ratio of 3 – 15 times is conveniently selected.

The pressing must be performed at a temperature below the softening point of the constituent sheet-formed and reticulated fibrous structures. If the pressure is exerted at a temperature above the softening point, the fibrous portion composing the resulting product is markedly flattened. In extreme cases, the product may be converted to films failing to provide favorable sheet-formed structures. The pressing can be effected by conventionaly employed means, such as calendering roll, pressing plate, etc. It is also possible to use an embossed roll or plate, to provide the products with an embossed pattern. The pressure exerted in the pressing is variable, depending on such factors as density of the sheet-formed structures, number of superposed sheets, and opening ratio, etc. The optimum pressure can be easily empirically determined, and normally ranges from 40 – 60 kg/cm$^2$.

Thus opened, sheet-formed, reticulated fibrous structures may be superposed on, or laminated with, other sheet-formed structure or structures, for example, an unopened, sheet-formed and reticulated fibrous material having numerous non-continuous cracks along one direction, which is prepared by the process of the present invention from the same or different polymer from that employed in the opened structures, or two of such materials superposed with their directions of cracks conformed, or such other sheet or sheets similarly opened, preceding the pressing. Thus formed laminate is then subjected to a pressure at a temperature below the softening point of the constituent polymer having the lowest softening point. Thus sheet materials of still reinforced strength in both longitudinal and lateral directions can be obtained. Particularly the laminate formed by superposing the opened sheet material of the invention with an unopened, sheet-formed and reticulated fibrous structure has the striped surface pattern formed by the fibers running in one direction like the grain of wood. Therefore, by emboss-processing such a laminate, a product having the appearance and hand resembling those of timber can be obtained, without the printing step.

In the preparation of such composite laminated structures, obviously the type of unopened, sheet-formed and reticulated fibrous structures, number of sheets to be laminated, opening ratio, pressing intensity, etc., can be suitably selected according to the intended utility of the product. The unopened, sheet-formed and reticulated fibrous structures to be superposed may be colored with pigment or dyestuff. If the sheet materials are colored with at least two different colors respectively, the laminate formed therefrom is imparted with the pattern formed by the colors intermingled in a complex manner. Similarly, the unopened sheet material obtained at the earlier stage of the second process and other sheet material or materials to be superposed therewith may be applied with different colors. If the so-formed laminate is further emboss-processed, the depressed portions may be compressed to film thickness, allowing the color of the under layer to show through. Thus, a multi-color pattern can be imparted to the product without printing step.

Furthermore, it is also possible to superpose at least two sheets of the product of the process of the invention, i.e., the unopened, sheet-formed and reticulated fibrous structures, with their directions of cracks conformed; pull the laminate in the direction perpendicular to the direction of cracks to cause opening; superpose the resulting opened web or the laminate of the webs with other unopened or opened sheet material, with a reinforcing layer or layers; and to press the laminate to form an integral and reinforced ornamental composite structures having improved physical properties. The superposing with the reinforcing material can be effected by placing the latter on one side of the laminate or between the laminate-forming layers, or interposing the latter between two of such webs or the laminates.

As the reinforcing layer to be employed in the above embodiment, for example, papers such as pulp paper, asbestos paper, and synthetic paper; woven or knit goods; non-woven fabrics such as glass mats and non-woven fabrics of natural, semi-synthetic and synthetic fibers; film such as synthetic resin films metal foils, and regenerated cellulosic film; foamed sheet; plate materials such as corrugated board, timber, plywood, hard board, asbestos plate, and metal plate; and the like can be used. By suitably selecting the specific reinforcing layer, such physical properties as strength, flame resistance, heat insulation, sound absorption, waterproofness, etc. can be imparted to the composite structures. The composite structures obtained may be further coated with a transparent surface-protective layer, such as cellophane, synthetic resin film and resinous coating material, if necessary. Thus the structures can be imparted with surface strength, washing resistance, dew-preventive property, etc.

Thus, main combinations of laminates formed can be expressed in simplified manner as follows, when the opened, sheet-formed and reticulated fiber structure prepared from at least two unopened, fibrous sheet materials prepared by the process of this invention is indicated as (A), other sheet-formed, reticulated fibrous structures which may be unopened or opened, as (B), and the reinforcing layer, as (C):

1. (A) alone
2. (A) + (B); (A) + (C)
3. (C) + (A) + (B); (A) + (C) + (B) (A) + (B) + (A); (B) + (A) + (B)
4. (B) + (A) + (C) + (A); (B) + (A) + (C) + (B)
5. (B) + (A) + (C) + (A) + (B)

The laminated composite structures may be impregnated with binder, if desired, preceding the pressing, to improve the strength and adhesion and fixture of the final products. As the binder, any of conventionally used agents may be used, such as a vinyl acetate type emulsion, vinyl chloride type emulsion, acrylic emulsion, NBR type latex, and SBR type latex, etc.

Hereinafter the process of this invention will be explained in further detail as to preferred embodiments, with reference to the attached drawings.

Figure 1:
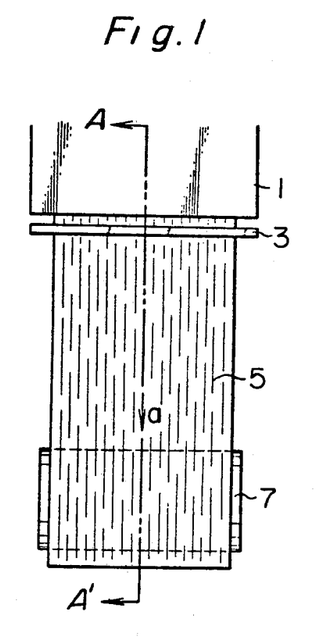
FIG. 1 is a plan view of a preferred arrangement for making the unopened, sheet-formed fibrous structures in accordance with the process of the present invention.
Figure 2:
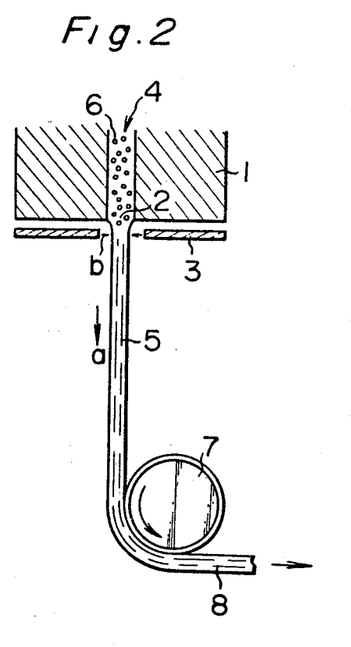
FIG. 2 is a cross-section of the apparatus shown in FIG. 1, cut along the line A—A.

Referring to FIGS. 1 and 2, molten polymer 4 of a thermoplastic resin containing a foaming substance is extruded through the die 1 having a slit 2 of 0.2 - 1.0 mm in width. The foaming substance may already be forming foams 6, or not yet foamed due to the extrusion pressure exerted inside the die. In both cases the foams grow, as soon as the molten polymer 4 is extruded through the slit 2 and released from the extrusion pressure. At the die exit, a cooling means 3 is provided either in contact with the exit or spaced therefrom by less than 5 mm, to blow a cooling gas against the extruded polymer (in the direction indicated with the arrow $b$ in FIG. 2). Therefore the molten polymer extruded through the die is quenched to a temperature below the Tg of the polymer. Consequently, the foaming of the polymer as above-described is not performed in unlimited manner but effected finely and uniformly, by the quenching of the molten polymer. The polymer extruded and quenched immediately after leaving from the die exit is simultaneously drafted in the direction of arrow $a$, by means of the take-up roller 7 positioned suitably spaced from the die exit, for example, by 200 mm. The drafting is accomplished by suitably adjusting the extrusion rate and rotation speed of the take-up roller, so as to make the draft ratio a value within the range of the maximum feasible draft ratio under the condition, to one-third thereof.

Upon quenching and simultaneously drafting of the extruded polymer, the numerous foams in the polymer collapse to form numerous cracks in the direction of arrow *a* in FIG. 2, thereby providing an unopened, sheet-formed and reticulated fibrous structure 8 which has numerous noncontinuous cracks along one direction.

The resulting sheet-formed structure can be wound up onto a take-up roller (not shown), or may be sent to the next processing step as it is.

Figure 3:
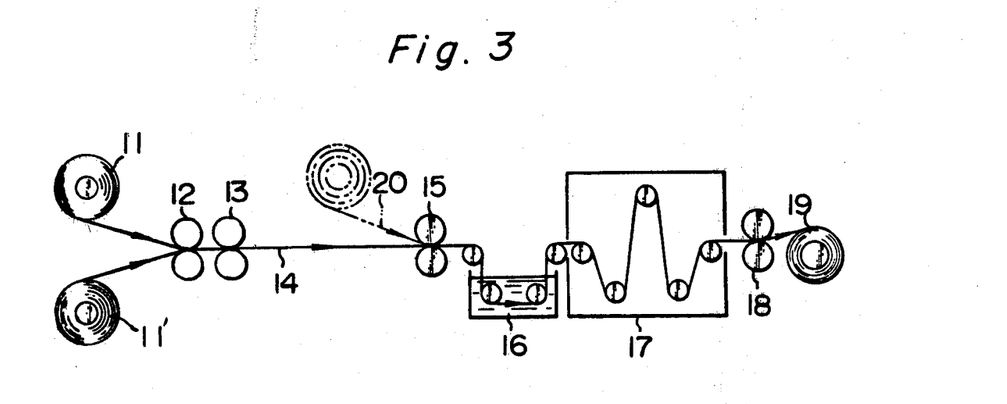
FIG. 3 is a flow chart showing a preferred embodiment for making the composite structures.
Figure 4:
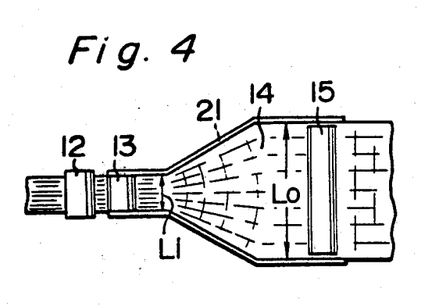
FIG. 4 is a diagrammatic view showing the manner of opening the web of unopened, sheet-formed and reticulated fibrous structure.
Figure 19:
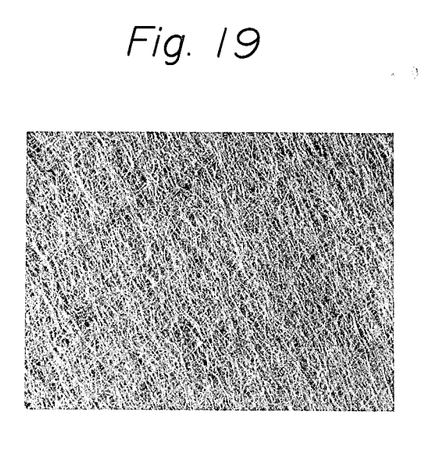
FIG. 19 is an enlarged photograph of the surface of an opened sheet-formed structure.

FIG. 3 explains the procedure of laminating at least two sheets of the unopened structures, opening the laminate and integrating them by exerting suitable pressure. The plural webs 11, 11' (in FIG. 3, two sheets are shown to be superposed, but if desired, more than two sheets can be laminated, using more than two take-up rolls) of the unopened, sheet-formed and reticulated fibrous structures as respectively wound up onto two take-up rolls are first sent to the first supply rolls 12 and second supply rolls 13. As desired, the webs 11 and 11' may be colored uniformly or differently. Then the superposed sheets are opened between the second supply rolls 13 and preliminary press rolls 15. The opening of the fibrous structures can be accomplished by the web holder 21 mounted between the second supply rolls 13 and preliminary press rolls 15 and which is opening fanwise from the second supply rolls toward the preliminary press rolls. In the embodiment of FIG. 3, Lo/Li corresponds to the opening ratio, which preferably ranges from 3 to 15 according to the subject invention. An enlarged photograph of the opened, sheet-formed and reticulated structure is given as FIG. 19.

The superposed and opened web 14 is optionally further superposed or laminated with other fibrous structures and/or reinforcing layer 20 such as film or foamed sheets, before it is subjected to the binding pressure. Then the laminate is passed through the preliminary press rolls 15. Thus laminated, integral sheet-formed material is optionally sent into a binder impregnation tank 16, dried at a dryer 17, and then compressed and set by the action of press roller 18 to provide a composite structure 19. The press roller 18 may be an ordinary calendering roll, to provide smooth-surfaced products. Whereas, if emboss rollers with various patterns are used as the press roller 18, ornamental composite structures with the surfaces projecting and depressing in the corresponding pattern can be obtained.

The composite structures obtained exhibit excellent physical properties such as mechanical strength and pliability, and are valuable for versatile utilities such as synthetic paper, wall paper, decoration paper, interior decoration materials such as ceiling panels and ornamental panels of furnitures, various construction materials, filters, non-woven fabrics, electrical insulator, wrapping materials, etc.

Hereinafter the invention will be explained in further detail, referring to working examples.

EXAMPLE 1

This Example is to demonstrate the significance of the temperature of quenching of the extrudate and of the draft ratio to the products.

Molten polymers of various thermoplastic resins into which the foaming substances specified in Table 1 below had been introduced under the specified pressures were extruded from a die, through its slit of 0.225 mm × 150 mm in size, at an extrusion rate of 23 g/min. The extrudates were quenched each to the temperature specified in Table 1, by the cooling apparatus provided in contact with the die exit, and simultaneously drafted at each specified draft ratio. The quality of the resulting sheet-formed and reticulated fibrous structures are also shown in Table 1. In the Table, the term "temperature of quenching" stands for the temperature of a surface of quenched extrudate immediately after leaving the die.

Table 1

Figure 5:
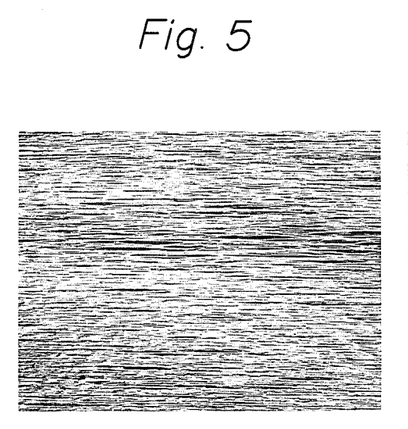
FIGS. 5, 8, 9, 11, 12, 14, 15, 20 and 21 are enlarged photographs of the unopened, sheet-formed and reticulated fibrous structures obtained in accordance with the subject process.
Figure 6:
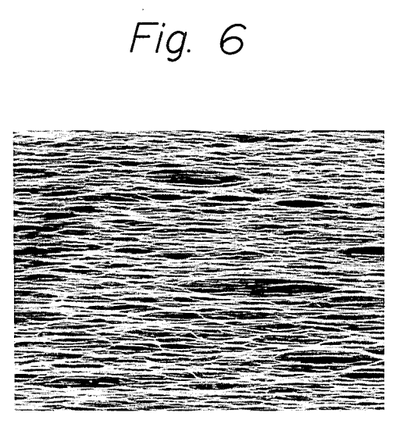
FIGS. 6, 7, 10, 13, 16, 17 and 18 are enlarged photographs of unopened, sheet-formed and reticulated fibrous structures which are control products.
Figure 7:
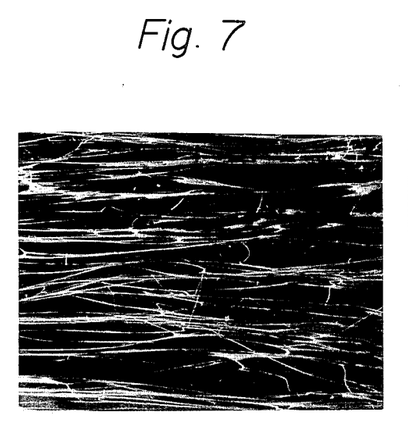
Figure 8:
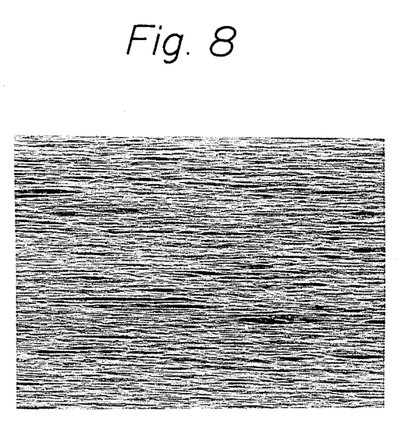
Figure 9:
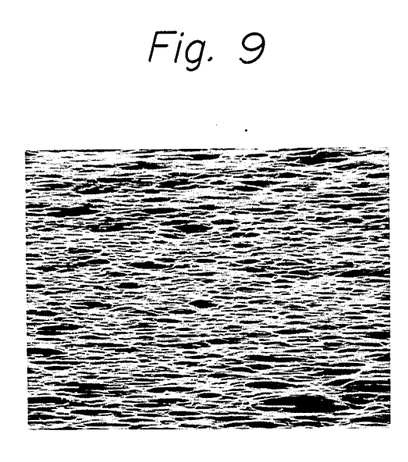

| Run No. | Resin Composition | Foaming Substance | Introduction Pressure of Foaming Substance (Kg/cm²) | Temperature of Molten Resin (°C.) | Tg of Resin (°C.) | Temperature of Quenching (°C.) | Draft Ratio | Quality of Resulting Sheet-formed Fibrous Structure | Enlarged photograph of Product |
|---|---|---|---|---|---|---|---|---|---|
| 1. (This invention) | Polystyrene 99% Talc 1% | Nitrogen gas | 24 | 250 | 80 | 55 | 150 (max.) | Composed of fine fibers, has small nodes; rich in pliability | FIG. 5 |
| 2. (") | " | " | 24 | 250 | 80 | 55 | 90 | " | — |
| 3. (") | " | " | 24 | 250 | 80 | 55 | 77 | Composed of fine fibers, has small nodes; slightly inferior in the opening property in the direction perpendicular to the cracks; satisfactory in pliability | — |
| 4. (") | " | " | 24 | 250 | 80 | 55 | 60 | Composed of the fine fibers has small nodes, but slightly inferior in the opening property in the direction perpendicular to the cracks and also in pliability | — |
| 5. (Control) | Polystyrene 99% Talc 1% | Nitrogen gas | 24 | 250 | 80 | 55 | 46 | Composed of thick fibers, has large nodes and large inferior in fiber-opening property and pliability | FIG. 6 |
| 6. (") | " | " | 24 | 250 | 80 | 55 | 31 | Opening property and pliability are further deteriorated | — |
| 7. (") | " | " | 24 | 250 | 80 | 55 | 105 | Has large nodes, random and large meshes, and lacks pliability | FIG. 7 |
| 8. (This invention) | Polycarbonate 99% Talc 1% | Carbon dioxide | 10 | 290 | 150 | 60 | 45 (max.) | Composed of fine fibers; has small nodes; rich in pliability | FIG. 8 |
| 9. (") | " | " | 10 | 290 | 150 | 120 | 33 | Composed of fibrous | FIG. 9 |

Table 1-continued

Figure 10:
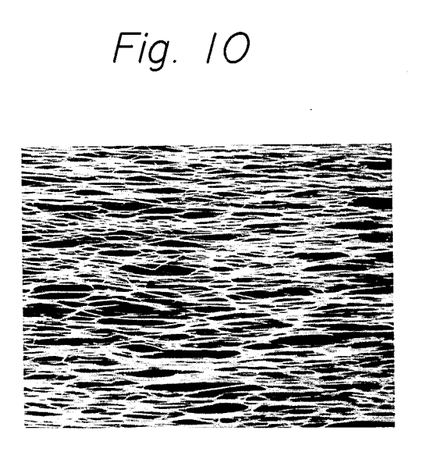
Figure 11:
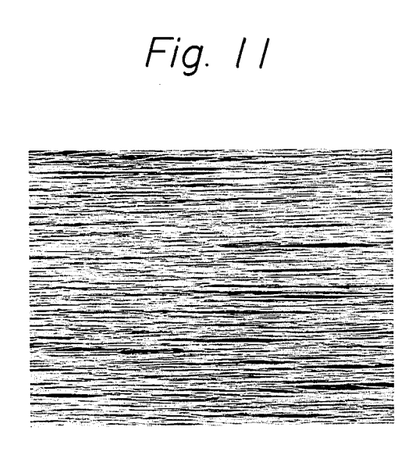
Figure 12:
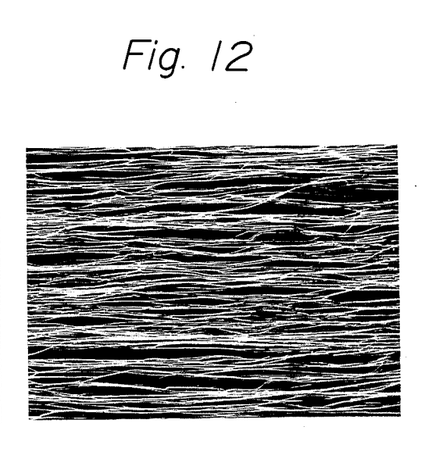
Figure 13:
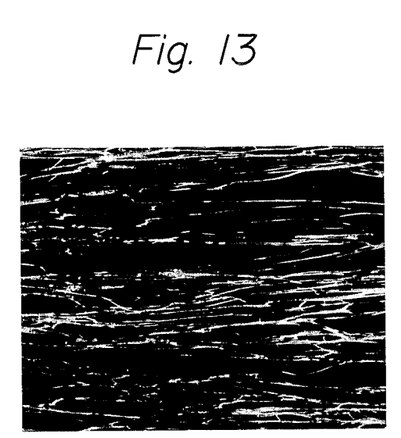
Figure 14:
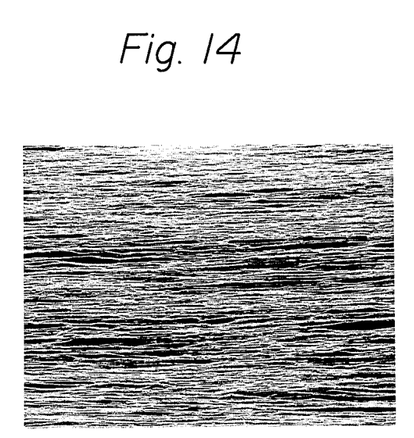
Figure 15:
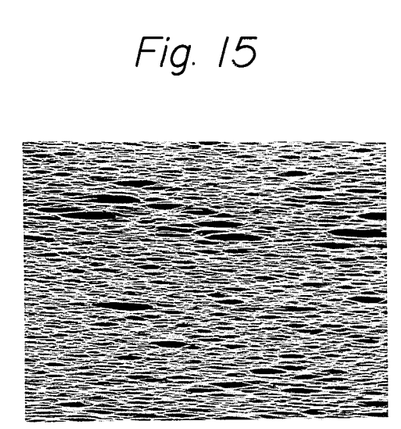
Figure 16:
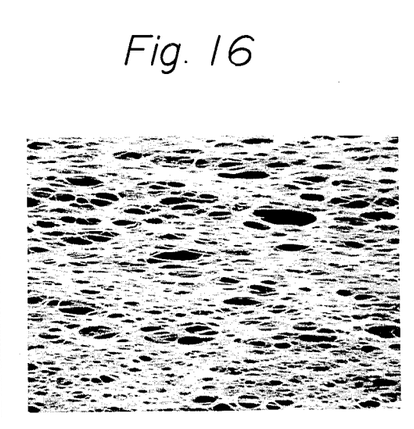

| Run No. | Resin Composition | Foaming Substance | Introduction Pressure of Foaming Substance (Kg/cm²) | Temperature of Molten Resin (°C.) | Tg of Resin (°C.) | Temperature of Quenching (°C.) | Draft Ratio | Quality of Resulting Sheet-formed Fibrous Structure | Enlarged photograph of Product |
|---|---|---|---|---|---|---|---|---|---|
| 10. (Control) | " | " | 10 | 290 | 150 | 150 | 33 | matter but has large nodes, and is somewhat inferior in pliability Composed of fibrous matter but has large nodes; lacks pliability | FIG. 10 |
| 11. (This invention) | Polyethylene-2,6-naphthalate 99% Talc 1% | Carbon dioxide | 11 | 287 | 113 | 60 | 80 (max.) | Composed of fine fibers; has small nodes; rich in pliability | FIG. 11 |
| 12. (") | " | " | 11 | 287 | 113 | 80 | 65 | Composed of fine fibers; has small nodes; rich in pliability; somewhat larger and non-uniform meshes | FIG. 12 |
| 13. (Control) | " | " | 11 | 287 | 113 | 113 | 65 | Composed of fibrous matter, but has large nodes and large and random meshes, lacks pliability | FIG. 13 |
| 14. (This invention) | Nylon-6 99% Talc 1% | Carbon dioxide | 14 | 260 | 50 | 45 | 80 (max.) | Composed of fine fibers; has small nodes; rich in pliability | FIG. 14 |
| 15. (") | " | " | 14 | 260 | 50 | 45 | 45 | Fibrilation in insufficient, but nodes are relatively small; sufficiently pliable | FIG. 15 |
| 16. (Control) | " | " | 14 | 260 | 50 | 45 | 8 | Fibrilation is definitely insufficient, and nodes are too large | FIG. 16 |

As clearly demonstrated from the foregoing results, according to th subject process (Run Nos. 1 - 4, 8, 9, 11, 12, 14, and 15), excellent sheet-formed fibrous structures which are composed of fine fibers, have small nodes and are rich in pliability, can be obtained. In contrast thereto, when the temperature of quenching of the extrudate at the die exit deviates from the specified range of this invention (Run Nos. 7, 10, and 13), or the draft ratio is outside the scope of this invention (Run Nos. 5, 6, and 16), the products have invariably large nodes and lack pliability.

EXAMPLE 2

This Example is to demonstrate the significance of the quenching position of extrudate to the quality of the product.

The procedures of Run No. 1 of Example 1 were repeated, except that the space between the position of the cooling means and the die exit was made 5 mm and 10 mm, respectively.

Figure 17:
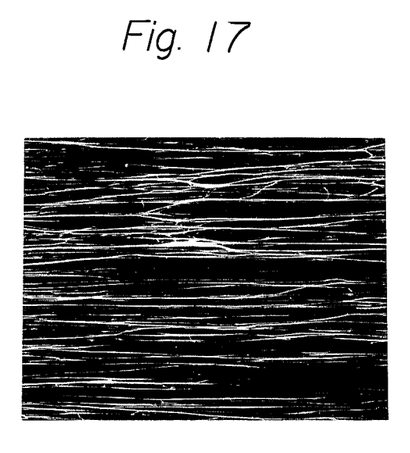

The product obtained when the cooling means was spaced from the die exit by 5 mm had larger nodes compared with those of the product of this invention (cf. FIG. 5), and had non-uniform and large meshes, as can be seen from the enlarged photograph of FIG. 17.

A sheet-formed and reticulated fibrous structure lacking pliability was obtained.

Figure 18:
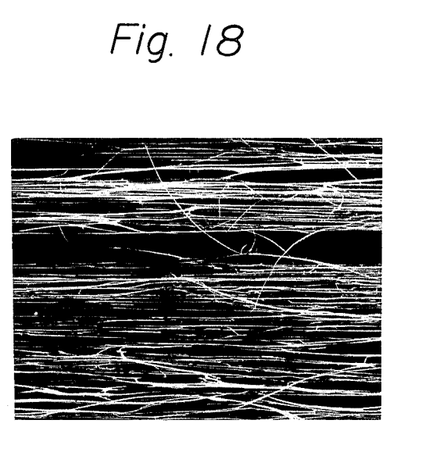

Similarly, when the cooling means was spaced from the die exit by 10 mm, the product had still larger nodes than the above, had random meshes and considerably many breakages, and lacked pliability as can be seen from the enlarged photograph of FIG. 18.

From the foregoing results, it can be safely concluded that the space between the device for cooling the extrudate and the die exit should be less than 5 mm.

EXAMPLE 3

The unopened, sheet-formed fibrous structure obtained in Run No. 1 of Example 1 (sample A) and the unopened, sheet-formed fibrous structure obtained in Run No. 8 (sample B) were superposed under the conditions specified in Table 2 below, opened, immersed in vinyl acetate type emulsion (pick-up; 30%), and pressed, with the results as given also in Table 2. In the table, "tensile strength (parallel) and (right angle)" means respectively the tensile strength measured by pulling the product along the direction of fibers in the starting sheet-formed samples, and in the direction perpendicular to said direction of fibers.

Table 2

| | Properties of Sheet-formed and Reticulated Fibrous Structures Before Lamination | | | | | | | | | Properties of Resulting Laminate | | | |
|---|---|---|---|---|---|---|---|---|---|---|---|---|---|
| | Thickness (μ) | Weight (g/m²) | Tensile Strength* (kg/cm²) Parallel | Right angle | Number of Sheets Laminated | Manner of Lamination | Direction of Extension | Opening Ratio (times) | Pressing Conditions | Thickness (μ) | Weight (g/m²) | Parallel | Right angles |
| Sample A | 25 | 3.5 | 0.56 | Almost nil | 240 | Coincided in the direction of cracks | In the direction at right angle to the direction of cracks | 10 | 50 kg/cm² 70°C. 1 minute | 250 | 110 | 100 | 75 |
| Sample B | 50 | 6.8 | 0.30 | Almost | 50 | Coincided | In the | 3.5 | 50 kg/cm² | 240 | 100 | 95 | 70 |

Table 2-continued

| Properties of Sheet-formed and Reticulated Fibrous Structures Before Lamination | | | | | | | | Properties of Resulting Laminate | | | |
|---|---|---|---|---|---|---|---|---|---|---|---|
| Thickness (μ) | Weight (g/m²) | Tensile Strength* (kg/cm²) Parallel | Right angle | Number of Sheets Laminated | Manner of Lamination | Direction of Extension | Opening Ratio (times) | Pressing Conditions | Thickness (μ) | Weight (g/m²) | Parallel | Right angles |
| | | | nil | | in the direction of cracks | direction at right angle to the direction of cracks | | 80°C. 1 minute | | | |

*Tensile strength was measured in accordance with JIS P-8113 (zipper interval : 20 mm, pull rate : 20 mm/min.)

As is apparent from Table 2, when the sheet-formed structures are laminated, opened, and pressed in accordance with the proces of this invention, composite structures exhibiting excellent tensile strength in both longitudinal and lateral directions can be obtained. Such products are very valuable as paper substitutes.

EXAMPLE 4

A molten polymer of polystyrene containing a foaming substance was extruded from a die with a slit of 0.35 mm × 150 mm in size, and immediately after the polymer was extruded, cooling air of not higher than 20°C. was blown against the extruded, molten polymer over the latter's full width. Thus the extrudate was quenched from 260°C. to 60°C., and then withdrawn at the draft ratio of 120.

The resulting structure had numerous non-continuous cracks along one direction (corresponding to the withdrawing direction ), with the interspaces of the cracks becoming fibrous. The product had the properties shown in Table 3 below.

Table 3

| | | | | | Properties of Sheet-formed, Reticulated Structure | |
|---|---|---|---|---|---|---|
| Polymer Composition | Foaming Substance | Draft Ratio | Thickness (μ) | Weight (g/m²) | Tensile Strength (g/d) Parallel | Right Angle |
| Polystyrene 99% Talc 1% | Nitrogen gas | 120 | 25 | 3.5 | 0.50 | Almost nil |

The sheet-formed structures were laminated under the conditions specified in Table 4, pulled, and opened. The laminate was further superposed on the unopened, sheet-formed structures as above-obtained, with their directions of cracks conformed. This latter laminate was impregnated with a binder (vinyl acetate type emulsion; pick-up: 25%), dried, and pressed.

As a result, paper-like structure having surface pattern of fine stripes like grain of wood in the longitudinal direction was obtained. When it was embossed in such a manner that the direction of surface cracks coincided with the direction of fiber axis of the grain, a paper-like composite structure resembling wood was obtained. The physical properties of the structure are also given in Table 4.

Table 4

| Sheet-formed Structure | | Unopened Sheet-formed Structures to be Laminated | | | Properties of Final Product | | | |
|---|---|---|---|---|---|---|---|---|
| Number of Sheets | Opening Ratio (times) | Number of Sheets | Opening Ratio (times) | Pressing Conditions | Tensile Strength (kg/cm²) Parallel | Right Angle | Thickness (μ) | Weight (g/m²) |
| 250 | 10 | 4 | 0 | 50 kg/cm² 80°C. 5 min. | 150 | 70 | 200 | 110 |

EXAMPLE 5

The colored, unopened, sheet-formed and reticulated fibrous structures having the properties as specified in Table 3, which were obtained as described in Example 4, were laminated, opened, immersed in a binder liquid (vinyl acetate type emulsion; pick-up: 25%), dried and pressed with emboss rollers, under the conditions specified in Table 5 below.

The resulting composite structure had such surface pattern that the projections in the pattern were brown, and the depressed portions were made as thin as film, allowing the black color underneath to show through. The properties of the final product were as given in Table 5.

Table 5

| Reticulated Sheet Material | | | Embossing Conditions | | | Properties of Final Product | | | |
|---|---|---|---|---|---|---|---|---|---|
| Number of Sheets | | Opening Ratio (times) | Pressure (kg/cm²) | Temperature (°C.) | Time (min.) | Tensile Strength (kg/cm²) Parallel | Right Angle | Thickness (μ) | Weight (g/m²) |
| (top: brown) | (back: black) | | | | | | | | |
| 150 | 50 | 10 | 75 | 90 | 3 | 145 | 75 | 195 | 100 |

EXAMPLE 6

Two-hundred-and-forty sheets of the unopened, reticulated fibrous structures having the properties specified in Table 3, which were obtained as described in Example 4, were laminated, and opened at an opening ratio of 10 times. Two of such laminates were superposed, with a sheet of polycarbonate film (thickness: 50μ) inserted therebetween, and integrated by pressing at 80°C., under a pressure of 50 kg/cm². As a result, a reinforced ornamental material having reticulated structure was obtained. This composite structure had a tensile strength of 3.9 kg/cm-width, and a voltage resistance of 9.3 kilovolts.

For comparison, conventional polyethylene webs were similarly laminated over the two surfaces of the same polycarbonate film. The product had a tensile strength of 3.1 kg/cm-width, and a voltage resistance of 8.1 kilovolts.

As clearly demonstrated by above results, the composite structure prepared in accordance with the subject invention has high tensile strength and extremely high voltage resistance, and therefore is suited as an insulated coating material for electric wire, etc.

EXAMPLE 7

Two-hundred-and-forty sheets of the unopened, reticulated structures having the properties as specified in Table 3, which were prepared as in Example 4, were laminated, opened at an opening ratio of 10 times, and integrated by pressing at 80°C. with a pressure of 40 kg/cm². Thus a sheet structure with reticulated pattern (weight: 100 g/m²) was obtained. This was adhered onto asbestos board base using a vinyl acetate type emulsion as the binder, and subjected to a combustibility test (JIS-A-1321-1970). Without the base the structure failed to pass the test, but as applied with the base, the composite structure passed the grade 1 of the test.

EXAMPLE 8

In order to prove that the process of the instant invention is also applicable to the cases where polymer blends are used, the following experiment was conducted.

As shown in Table 6 below, a blend of 3.70 kg of polystyrene, 1.25 kg of nylon-6 and 50 g of talc, or a blend of 4.85 kg of polystyrene, 100 g of low density polyethylene and 50 g of talc was melted in the screw extruder at 300°C. and nitrogen gas as a foaming substance was introduced into the molten polymer blend at a pressure of 55 kg/cm². The molten polyer blend so obtained was extruded at the extrusion amount of 40 g/min. from the circular die having an annular slit of 150 mm in diameter and 0.25 mm in slit clearance. The extrudate was quenched at a temperature tabulated at the point 1 mm away from the die surface by means of a cooling apparatus disposed adjacent to the die exit and at the same time, drafted at a draft ratio tabulated and taken up.

The sheet-like fiber structure so obtained had been composed of fine fibers, being small in nodes and rich in softness, and the sheet-like fiber structure so obtained was then heat-treated at 100°C. for 3 minutes; a fiber-like structure having a filling degree of 4% with rich bulkiness was thus obtained.

Table 6

Figure 20:
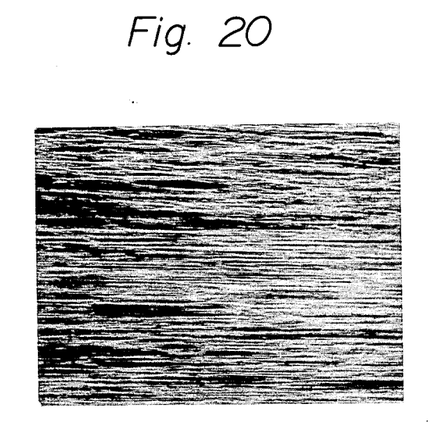
Figure 21:
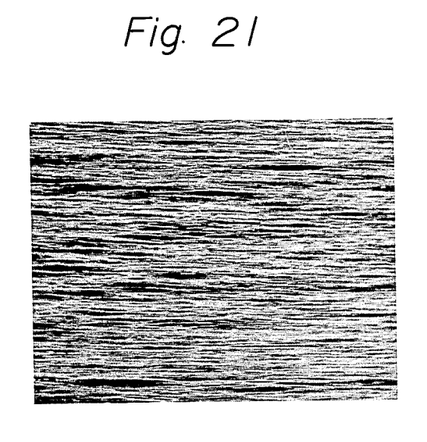

| Resin composition | Foaming substance | Resin melt temperature (C.) | Tg of the resin blend (°C.) | Temperature of quenching | Draft ratio | Enlarged photo of product |
|---|---|---|---|---|---|---|
| polystyrene + nylon-6 + talc | nitrogen gas | 280 | 72 | 50°C. | 150 | FIG. 20 |
| polystyrene + low density polyethylene + talc | | 275 | 76 | 48°C. | 150 | FIG. 21 |

EXAMPLE 9

Molten polymers of various thermoplastic resins into which the foaming substances specified in Table 7 below had been introduced under the specified pressures were extruded from a die, through its slit having 150 width and lip distance specified in Table 7, at an extrusion rate of 23 g/min. The extrudates were quenched each to the temperature specified in Table 7, by the cooling apparatus provided in contact with the die exit, and simultaneously drafted at each specified draft ratio. The quality of the resulting sheet-formed and reticulated fibrous structures are also shown in Table 7. In the Table, the term "temperature of quenching" stands for the temperature of a surface of quenched extrudate immediately after leaving the die.

Table 7

| Run No. | Resin Composition | Lip distance (mm) | Foaming Substance | Introduction Pressure of Foaming Substance (kg/cm²) | Temperature of Molten Resin (°C.) | Tg of Resin (°C.) | Temperature of quenching (°C.) | Draft Ratio | Quality of Resulting Sheet-formed Fibrous Structure |
|---|---|---|---|---|---|---|---|---|---|
| 1. (This invention) | Polystyrene 99% Talc 1% | 0.15 | Nitrogen gas | 50 – 55 | 250 | 80 | 55 | 150 | That netty fiber is produced which is composed of very fine fibers (thickness: several microns to ten and several microns): has small nodes; rich in pliability; sufficiently possible in fiber-opening |

Table 7-continued

| Run No. | Resin Composition | Lip distance (mm) | Foaming Substance | Introduction Pressure of Foaming Substance (kg/cm²) | Temperature of Molten Resin (°C.) | Tg of Resin (°C.) | Temperature of quenching (°C.) | Draft Ratio | Quality of Resulting Sheet-formed Fibrous Structure |
|---|---|---|---|---|---|---|---|---|---|
| 2. (Control) | " | 0.08 | " | " | " | " | " | " | properties in the direction perpendicular to cracking. Form very fine fibers in the order of several microns; easy to cut at the time of take-up and insufficient in productivity; tend to cut in opening properties in the direction perpendicular to cracking thereby rendering a uniform opening difficult. |
| 3. (Control) | Polystyrene 99% Talc 1% | 1.2 | " | " | " | " | — | — | Difficult to produce a desired reticulated fibrous structure. |
| 4. (This invention) | Polyethylene terephthalate 69% Polypropyrene 30% Talc 1% | 0.25 | " | " | 260 | 62.6 | 50 | 120 | That netty fiber is produced which is composed of very fine fibers in the order of ten and several microns; has small nodes; rich in pliability; sufficiently possible in fiber-opening properties in the direction perpendicular to cracking. |
| 5. (This invention) | Styrene-acrylonitrile copolymer (mole percentage of styrene = 0.75) | " | " | " | " | 97 | 60 | 150 | That netty fiber is produced which is composed of very fine fibers in the order of several microns to ten and several microns; has small nodes; rich in pliability; sufficiently possible in fiber-opening properties in the direction perpendicular to cracking. |

What we claim is:

1. A process for the preparation of composite structure. which comprises:
   a. extruding a molten thermoplastic resin selected from the group consisting of styrene resins, polyamide resins, polyester resins, vinyl resins, polycarbonate resins, acrylic resins, and copolymers and blends thereof containing a foaming substance through a die with a slit clearance of 0.1 to 1.0 mm;
   b. quenching the extrudate at a point less than 5 mm away from the die surface to a temperature below the glass highest transition temperature of the resin;
   c. simultaneously taking up the extrudate at a draft ratio between the maximum draft ratio of the extrudate and one-third thereof, thereby fibrillating the extrudate just as it leaves the die exit;
   d. laminating at least two sheets of thus obtained unopened, sheet-formed and reticulated fibrous structures so that the directions of the fibers of these structures are identical to each other;
   e. pulling the laminate in the direction perpendicular to the direction of the fibers to open the same; and
   f. pressing the opened, sheet-formed laminate so obtained at a temperature lower than the lowest softening point of any constituent of said sheet-formed laminate.

2. The process of claim 1, wherein said thermoplastic resin is a blend of polystyrene or nylon and at most 40% by weight based on the blend of a polyolefin selected from polyethylene, polypropylene and polybutene-1.

3. The process of claim 1, wherein said extrudate is quenched to a temperature at least 5°C. lower than the glass transition temperature of the resin by blowing cooled air against said extrudate just as it leaves the die.

4. The process of claim 1, wherein said draft ratio is effected between the maximum draft ratio possible under the conditions and three-fourths thereof.

5. The process of claim 1, wherein said pressing is carried out by embossing process.

6. The process of claim 1, wherein said at least two sheets of unopened, sheet-formed and reticulated fibrous structures are applied with each having different colors.

7. The process of claim 1, wherein said laminated sheet-formed structure is impregnated with a binder before pressing.

8. The process of claim 1, wherein said thermoplastic resin has a glass transition temperature of at least 0°C.

9. The process of claim 8, wherein said thermoplastic resin has a glass transition temperature of at least 40°C.

10. The process of claim 9, wherein said extrudate is quenched to a temperature between a temperature 5°C. lower than the glass transition temperature of the resin and room temperature.

11. The process of claim 1, wherein said pressing is carried out after superimposing said opened, sheet-formed laminate with at least one other sheet-formed material, at a temperature lower than the lowest softening point of any constituent of said sheet-formed laminate or said other sheet-formed material.

12. The process of claim 11, wherein said other sheet-formed material is an unopened or opened sheet-formed and reticulated fibrous structure having numerous non-continuous cracks along one direction.

13. The process of claim 11, wherein said other sheet-formed material is a non-woven fabric.

14. The process of claim 11, wherein said other sheet-formed material is a film.

15. The process of claim 11, wherein said opened sheet-formed structures and other sheet-formed material are applied with each having different colors.

* * * * *

UNITED STATES PATENT AND TRADEMARK OFFICE
CERTIFICATE OF CORRECTION

PATENT NO. : 3,980,513
DATED : September 14, 1976
INVENTOR(S) : OMORI, ET AL.

It is certified that error appears in the above-identified patent and that said Letters Patent are hereby corrected as shown below:

Insert the following Foreign Application Priority Data:
-- July 28, 1970   Japan ........ 45/65893 --

Claim 1, line 11, delete "glass highest", insert -- highest glass --

Signed and Sealed this

Thirtieth Day of November 1976

[SEAL]

Attest:

RUTH C. MASON
*Attesting Officer*

C. MARSHALL DANN
*Commissioner of Patents and Trademarks*